United States Patent
Chiu et al.

(10) Patent No.: US 11,029,541 B2
(45) Date of Patent: Jun. 8, 2021

(54) OPTICAL ARTICLE WITH BLUE CUT, HIGH UV CUT AND HIGH CLARITY

(71) Applicant: ESSILOR INTERNATIONAL, Charenton-le-Pont (FR)

(72) Inventors: Hao Wen Chiu, Holden, MA (US); Aref Jallouli, Shrewsbury, MA (US); Haifeng Shan, Shrewsbury, MA (US)

(73) Assignee: Essilor International, Charenton-le-Pont (FR)

( * ) Notice: Subject to any disclaimer, the term of this patent is extended or adjusted under 35 U.S.C. 154(b) by 161 days.

(21) Appl. No.: 16/335,199

(22) PCT Filed: Sep. 20, 2017

(86) PCT No.: PCT/EP2017/073800
§ 371 (c)(1),
(2) Date: Mar. 20, 2019

(87) PCT Pub. No.: WO2018/054988
PCT Pub. Date: Mar. 29, 2018

(65) Prior Publication Data
US 2019/0346694 A1 Nov. 14, 2019

(30) Foreign Application Priority Data
Sep. 20, 2016 (EP) .................................. 16306206

(51) Int. Cl.
*G02C 7/10* (2006.01)
*B29D 11/00* (2006.01)
*C09B 47/00* (2006.01)
*B29K 69/00* (2006.01)
*B29K 105/00* (2006.01)

(52) U.S. Cl.
CPC ........ *G02C 7/104* (2013.01); *B29D 11/00634* (2013.01); *C09B 47/00* (2013.01); *G02C 7/108* (2013.01); *B29K 2069/00* (2013.01); *B29K 2105/0032* (2013.01); *G02C 2202/10* (2013.01)

(58) Field of Classification Search
CPC ................................ G02C 7/104; G02C 7/108
See application file for complete search history.

(56) References Cited

U.S. PATENT DOCUMENTS 4,716,234 A 12/1987 Dunks et al.
2002/0008018 A1 1/2002 Murayama et al.
(Continued)

FOREIGN PATENT DOCUMENTS

EP 0402473 5/1994
JP 2005/257840 9/2005
(Continued)

OTHER PUBLICATIONS

Office Action Issued in Chinese Patent Application No. 201680069889.6. dated Dec. 10, 2019.
(Continued)

*Primary Examiner* — James C. Jones
(74) *Attorney, Agent, or Firm* — Norton Rose Fulbright US LLP (57) ABSTRACT

The combination of selective and high pass filters to cut harmful blue light allowed to achieve the best compromise between high blue cut performance, high UV cut and low yellow index, not achievable when using the filters alone.

19 Claims, 3 Drawing Sheets

(56) References Cited

U.S. PATENT DOCUMENTS

2005/0243272 A1\* 11/2005 Mainster ................ G02C 7/108
   351/159.24
2011/0266505 A1\* 11/2011 Laredo .................. C09B 69/106
   252/586

FOREIGN PATENT DOCUMENTS

| JP | 2009/179866 | 8/2009 |
| WO | WO 2009/102454 | 8/2009 |
| WO | WO 2010/111499 | 9/2010 |
| WO | WO 2013/084177 | 6/2013 |
| WO | WO 2014/055513 | 4/2014 |

OTHER PUBLICATIONS

International Search Report and Written Opinion issued in International Patent Application No. PCT/EP2017/073800, dated Dec. 14, 2017.

\* cited by examiner

OPTICAL ARTICLE WITH BLUE CUT, HIGH UV CUT AND HIGH CLARITY

CROSS-REFERENCE TO RELATED APPLICATIONS

This application is a national phase application under 35 U.S.C. § 371 of International Application No. PCT/EP2017/073800 filed 20 Sep. 2017, which claims priority to European Patent Application No. 16306206.0 filed 20 Sep. 2016. The entire contents of each of the above-referenced disclosures is specifically incorporated by reference herein without disclaimer.

FIELD OF THE INVENTION

The invention relates to the field of optical lenses, especially ophthalmic lenses, including ophthalmic lenses for spectacles and sunglasses.

BACKGROUND

Blue light at a wavelength range of 400-500 nm, more specifically 400-460 nm and especially 415-455 nm is harmful to human eyes and has been described as playing a role in certain ocular diseases such as age-related macular degeneration (AMD).

Blue-cut filters are added into ophthalmic lenses to absorb blue light and limit the transmission of blue light through the lens and into the eye.

There are generally two types of filters used in the art to achieve blue-cut in ophthalmic elements:
  selective filters partially absorbing light in the blue wavelength range in narrow bandwith, such as notch filters, and
  high-pass filters, that typically cut wavelength transmission in the UV light wavelength range up to a certain wavelength and partially block blue light in the 400-500 nm range.

Although both filters could be used to achieve a blue-cut target, each filter has its own benefits and shortcomings.

Selective filters do not provide additional UV protection over a lens substrate itself, which generally has a UV-cut as defined by the wavelength at which transmittance is ≤1%. This is typically on the order of 380 nm for ophthalmic-grade polycarbonate (PC) resin lenses at 1.1 mm center thickness.

High-pass filters provide added UV protection over a lens substrate. A typical PC lens with a high pass filter has a UV-cut around 400 nm. The incorporation of high-pass filters results in lenses with undesirably high yellowness index (YI).

In order to provide to consumers a lens product with superior blue light and UV light-blocking abilities, the drawbacks of high-pass filters and selective filters must be addressed.

SUMMARY

Disclosed herein are articles and methods that combine selective filters and high pass filters to achieve the benefits of both filters, in particular high blue-cut and high UV protection. The cooperative combination of selective filters and high-pass filters to reduce harmful blue light results in lenses with optimized blue-cut along with UV-cut performance.

It has been found that the cooperative combination of these two elements allows for the production of lenses with a good blue light protection and higher reduced retinal cell apoptosis, while keeping low yellow index and marginal decrease in transmittance that is not achievable when using the filters alone. Some aspects of the disclosure are directed towards optical articles with enhanced ultraviolet and blue light-blocking ability that are used for protecting at least part of an eye of a user from phototoxic blue light.

In some embodiments, the optical article of the invention comprises a selective filter at least partially blocking blue light in a wavelength range chosen within the 400-460 nm range, and a high-pass filter having its maximum cut in the UV light wavelength range and partially blocking blue light in the 400-500 nm range.

In some aspects, the optical element blocks at least 66% of light with a wavelength less than or equal to about 410 nm, at each wavelength in the wavelength range 350-410 nm, preferably at each wavelength in the wavelength range 315-410 nm.

In another embodiment, the optical element blocks>95% of light with a wavelength less than or equal to about 408 nm, at each wavelength, in the wavelength range 350-408 nm, preferably at each wavelength in the wavelength range 315-408 nm.

In some aspects, the transparent optical article with enhanced ultraviolet and blue light blocking ability comprises: a selective filter at least partially blocking blue light in a wavelength range chosen within the 400-460 nm range, and a high-pass filter having its maximum cut in the UV light wavelength range and partially blocking blue light in the 400-500 nm range and the optical article blocks at least 66% of light with a wavelength less than or equal to about 410 nm at each wavelength in the wavelength range 350-410 nm, preferably at each wavelength in the wavelength range 315-410 nm.

A selective filter according to the invention selectively inhibits/blocks transmission of light in a selected range chosen within the 400-500 nm range while having little or no effect on transmission of wavelengths outside the selected wavelength range, unless specifically configured to do so.

Preferably, the selected range is chosen within the 400-460 nm range, more preferably within the 400-455 nm range, or 400-450 nm range.

More preferably, the selective filter according to the invention preferably blocks or cuts at least 5% of the light in the selected wavelength range, preferably at least 8%, more preferably at least 12%. When defined in relation to the selective filter, "blocking X %" of incident light in a specified wavelength range does not necessarily mean that some wavelengths within the range are totally blocked, although this is possible. Rather, "blocking X %" of incident light in a specified wavelength range means that an average of X % of said light within the range is not transmitted. As used herein, the light blocked in this way is light arriving on the main face of the optical article onto which the layer comprising the at least one optical filtering means is deposited, generally the front main face.

The bandwidth of the selected range can preferably range from 10 to 70 nm, preferably from 10 to 60 nm.

Preferably the selective filter is a notch filter.

Inhibition rate refers to the percentage of incident light within one or more selected range of wavelengths which is prevented from being transmitted (inhibition rate=(100−Transmission)

In some aspects, the selective filter is an absorbing dye at least partially absorbing light in the 400-460 nm wavelength range.

In some embodiments, the absorbing dye has an absorption peak (corresponding to a minimum of transmission associated to an of the selected wavelength range) centered at a wavelength chosen within the 410-440 nm wavelength range and exhibits a full width at half maximum (FWHM) lower than or equal to 40 nm, preferably lower than or equal to 30 nm, more preferably lower than 25 nm, in particular lower than 20 nm and preferably higher than or equal to 5 nm, even more preferably higher than or equal to 10 nm.

The definition of FWHM is FWHM=$\lambda$high–$\lambda$low
wherein $\lambda$high and $\lambda$low occur on either side of the absorption peak wavelength, where the absorption is nearest: (Peak absorption–Baseline absorption)/2.

FWHM can also be calculated on absorbance spectrum of the absorbing dye

The definition of FWHM in this case is FWHM=$\lambda$high–$\lambda$low
wherein $\lambda$high and $\lambda$low occur on either side of the absorbance peak wavelength, where the absorbance is nearest: (Peak absorbance–Baseline absorbance)/2.

As known by the man skilled in the art, the relation between transmittance values T and absorbance value A is: $A = 2 - \log_{10}\% T$ (at each wavelength).

The FWHM values of the absorbance spectrum of the absorbing dye are chosen in the same range as defined above for absorption.

A preferred absorbing dye has a specific absorption coefficient higher than 200 $L \cdot g^{-1} \cdot cm^{-1}$ in methylene chloride. In particular, a preferred absorbing dye A has a specific absorption coefficient higher than 300, preferably higher than 400 and typically higher than 500 $L \cdot g^{-1} \cdot cm^{-1}$ in methylene chloride.

A preferred absorbing dye is ABS420™, provided by Exciton.

The chemical nature of the absorbing dye that may act as filter for at least partially inhibiting light having the selected wavelength range is not particularly limited as far as the absorbing dye acts as a selective filter. Blue light blocking dyes, typically yellow dyes, are preferably selected to have little or no absorbance in other parts of the visible spectrum to minimize the appearance of other colors.

Examples of absorbing dyes that can be used as selective filters are described in WO2013/084177.

Between those dyes, dyes relating to the porphine/porphyrin family are preferred.

Porphyrins are well-known macrocycle compounds composed of four modified pyrrole subunits interconnected at their carbon atoms via methine bridges.

The parent porphyrin is porphine and substituted porphines are called porphyrins. Porphyrins are the conjugate acids of ligands that bind metals to form (coordination) complexes.

Certain porphyrins or porphyrin complexes or derivatives are interesting in that they provide selective absorption filters having a FWHM in some cases of for example 20 nm or less in the selected blue range of wavelengths. The selectivity property is in part provided by the symmetry of the molecules. Such selectivity helps to limit the distortion of the visual perception of color, to limit the detrimental effects of light filtering to scotopic vision and to limit the impact on circadian rhythm.

For example, the one or more porphyrins or porphyrin complexes or derivatives are selected from the group consisting of Chlorophyll a; Chlorophyll b; 5,10, 15,20-tetrakis (4-sulfonatophenyl) porphyrin sodium salt complex; 5,10, 15,20-tetrakis(N-alkyl-4-pyridyl) porphyrin complex; 5,10, 15,20-tetrakis(N-alkyl-3-pyridyl) porphyrin complex, and 5,10,15,20-tetrakis(N-alkyl-2-pyridyl) porphyrin complex, the alkyl being preferably an alkyl chain, linear or branched, comprising 1 to 4 carbon atoms per chain. For example the alkyl may be selected from the group consisting of methyl, ethyl, butyl and propyl.

The complex usually is a metal complex, the metal being selected from the group consisting of Cr(III), Ag(II), In(III), Mn(III), Sn(IV), Fe (III), Co (II), Mg(II) and Zn(II). Cr(III), Ag(II), In(III), Mn(III), Sn(IV), Fe (III), Co(II), Zn(II) and Cu cation demonstrate absorption in water in the range of 425 nm to 448 nm with sharp absorption peaks.

Moreover, the complexes they provide are stable and not acid sensitive. Cr(III), Ag(II), In(III), Sn(IV), Fe (III), in particular, do not exhibit fluorescence at room temperature.

In some embodiments the one or more porphyrins or porphyrin complexes or derivatives are selected from the group consisting of magnesium meso-tetra(4-sulfonatophenyl) porphine tetrasodium salt, magnesium octaethylporphyrin, magnesium tetramesitylporphyrin, octaethylporphyrin, tetrakis (2,6-dichlorophenyl) porphyrin, tetrakis (o-aminophenyl) porphyrin, tetramesitylporphyrin, tetraphenylporphyrin, zinc octaethylporphyrin, zinc tetramesitylporphyrin, zinc tetraphenylporphyrin, and diprotonated-tetraphenylporphyrin In some embodiments, the high-pass filter is a UV absorber.

In an embodiment, the UV absorber high pass filter is a benzotriazolie compound. In particular embodiments, the benzotriazole compound is 2-(5-chloro-2H-benzotriazole-2-yl)-6-(1,1-dimethylethyl)-4-methyl phenol.

Preferably, the UV absorber used as the high pass filter is not fluorescent.

In some embodiments, the resin composition comprises a selective filter concentration ranging from 1 to 10 ppm, preferably from 1 to 5 ppm, more preferably from 1 to 2 ppm.

In some embodiments, the resin composition comprises from 0.1 to 2.0 weight % of UV absorber as the high-pass filter, based on the weight of the resin composition.

In some embodiments, the optical article has a BVC(B') value of ≥15%, more preferably ≥18%, better ≥20%. In some aspects, the optical article has a colorimetric coefficient b* as defined in the CIE (1976) L*a*b* international colorimetric system that is less than or equal to 5. In some aspects, the optical article has a colorimetric coefficient a* as defined in the CIE (1976) L*a*b* international colorimetric system that is less than or equal to 4 or 3.

In some embodiments, the optical articles of the invention provide a RCAR of at least 13%, preferably at least 17%, more preferably at least 19%.

In some embodiments, the selective filter and high-pass filter reduce the through transmittance of light with a wavelength less than or equal to about 408 nm in an additive fashion or a synergistic fashion.

In some embodiments, the article further comprises a color-balancing additive.

In some aspects, the optical elements has a transmittance Tv of greater than 95%, more preferably greater than 96% In some aspects, the optical elements has a yellow index of less than 6.

It is another object of the disclosure to provide a wafer for reducing through-transmittance of light with a wavelength less than or equal to about 410 nm, preferably 408 nm, to a substrate, comprising a blend of a transparent polymer resin, a selective filter at least partially blocking blue light in a wavelength range chosen within the 400-460 nm range, and a high-pass filter having its maximum cut in the UV light wavelength range and partially blocking blue light in the 400-500 nm range for reducing through-transmittance of light with a wavelength less than or equal to about 410 nm or 408 nm to a substrate.

In some aspects, the wafer comprises at least one layer that includes a transparent polymer resin, a selective filter, and a high-pass filter. In some embodiments, the wafer further comprises a color-balancing additive. The wafer protects at least a part of a user's eye from phototoxic blue light.

In some aspects, the absorbing dye as selective filter is a porphine, a porphyrine and/or a porphyrin complex or derivative.

In some embodiments, the high-pass filter is a benzotriazole compound. In particular embodiments, the benzotriazole compound is 2-(5-chloro-2H-benzotriazole-2-yl)-6-(1,1-dimethylethyl)-4-methyl phenol.

In some embodiments, the wafer or wafer layer comprises the absorbing dye acting as a selective filter at a concentration ranging from 1 to 10 ppm. In some embodiments, the wafer or wafer layer comprises from 0.1 to 2.0 weight % of the UV absorber acting as high-pass filter, based on the weight of the wafer or wafer layer. In some embodiments, the notch filter and high-pass filter reduce the through transmittance of light with a wavelength less than or equal to about 408 nm in an additive fashion or a synergistic fashion.

The optical article can be prepared by method known in the art.

The absorbing dye can dispersed or dissolved within polymer substrate at a concentration ranging from 1 to 10 ppm.

The UV absorber can be dispersed or dissolved within polymer substrate at a concentration ranging from 0.1 to 2.0 weight %.

The preferred polymer substrate is polycarbonate.

The absorbing dye and the UV absorber can be incorporated in a coating and applied on a substrate thus forming the final optical article.

It is an object of the disclosure to provide a process for enhancing the blue-cut performance of a transparent polymer base resin comprising blending the transparent polymer base resin with a an absorbing dye as a selective filter at least partially blocking blue light in a wavelength range chosen within the 400-460 nm range and a UV absorber as a high-pass filter having its maximum cut in the UV light wavelength range and partially blocking blue light in the 400-500 nm range and forming the resin composition into an optical article. In some aspects, the resin composition is formed into an optical article by a process selected from the group consisting of dry blending, melt mixing, and solvent mixing.

In some aspects, the selective filter is an absorbing dye and is preferably ABS 420™. In particular aspects, the absorbing dye as selective blue filter is ABS420™. In some embodiments, the high-pass filter is a benzotriazole compound. In particular embodiments, the benzotriazole compound is 2-(5-chloro-2H-benzotriazole-2-yl)-6-(1,1-dimethylethyl)-4-methyl phenol. In some embodiments, the resin composition comprises an absorbing dye as selective filter at a concentration ranging from 1 to 10 ppm. In some embodiments, the resin composition comprises from 0.1 to 2.0 weight % of UV absorber as the high-pass filter, based on the weight of the resin composition. In some embodi-ments, the notch filter and high-pass filter reduce the through transmittance of light with a wavelength less than or equal to about 410 nm in an additive fashion or a synergistic fashion.

In some embodiments, the optical article is made of a resin composition comprising a polycarbonate polymer, a selective filter at least partially blocking blue light in a wavelength range chosen within the 400-460 nm range, and a high-pass filter having its maximum cut in the UV light wavelength range and partially blocking blue light in the 400-500 nm range In some aspects, a lens, film, laminate, wafer, or other optical article comprising a selective filter, such as a notch filter, and a high-pass filter is used for protecting at least part a user's eye from phototoxic blue light.

Any embodiment of any of the disclosed compositions and/or methods can consist of or consist essentially of—rather than comprise/include/contain/have—any of the described elements and/or features and/or steps. Thus, in any of the claims, the term "consisting of" or "consisting essentially of" can be substituted for any of the open-ended linking verbs recited above, in order to change the scope of a given claim from what it would otherwise be using the open-ended linking verb.

The term "substantially" and its variations are defined as being largely but not necessarily wholly what is specified as understood by one of ordinary skill in the art, and in one non-limiting embodiment substantially refers to ranges within 10%, within 5%, within 1%, or within 0.5%.

"Analogue" and "analog," when referring to a compound, refers to a modified compound wherein one or more atoms have been substituted by other atoms, or wherein one or more atoms have been deleted from the compound, or wherein one or more atoms have been added to the compound, or any combination of such modifications. Such addition, deletion or substitution of atoms can take place at any point, or multiple points, along the primary structure comprising the compound.

"Derivative," in relation to a parent compound, refers to a chemically modified parent compound or an analogue thereof, wherein at least one substituent is not present in the parent compound or an analogue thereof. One such non-limiting example is a parent compound which has been covalently modified. Typical modifications are amides, carbohydrates, alkyl groups, acyl groups, esters, pegylations and the like.

The term "about" or "approximately" or "substantially unchanged" are defined as being close to as understood by one of ordinary skill in the art, and in one non-limiting embodiment the terms are defined to be within 10%, preferably within 5%, more preferably within 1%, and most preferably within 0.5%. Further, "substantially non-aqueous" refers to less than 5%, 4%, 3%, 2%, 1%, or less by weight or volume of water.

The use of the word "a" or "an" when used in conjunction with the term "comprising" in the claims and/or the specification may mean "one," but it is also consistent with the meaning of "one or more," "at least one," and "one or more than one."

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The compositions and methods for their use can "comprise," "consist essentially of," or "consist of" any of the ingredients or steps disclosed throughout the specification. With respect to the transitional phase "consisting essentially of," in one non-limiting aspect, a basic and novel characteristic of the compositions and methods disclosed in this specification includes the compositions' abilities to passage of blue light through an optical article.

Other objects, features and advantages of the present invention will become apparent from the following detailed description. It should be understood, however, that the detailed description and the examples, while indicating specific embodiments of the invention, are given by way of illustration only. Additionally, it is contemplated that changes and modifications within the spirit and scope of the invention will become apparent to those skilled in the art from this detailed description.

DETAILED DESCRIPTION

Various features and advantageous details are explained more fully with reference to the non-limiting embodiments that are illustrated in the accompanying drawings and detailed in the following description. It should be understood, however, that the detailed description and the specific examples, while indicating embodiments, are given by way of illustration only, and not by way of limitation. Various substitutions, modifications, additions, and/or rearrangements will be apparent to those of ordinary skill in the art from this disclosure.

In the following description, numerous specific details are provided to provide a thorough understanding of the disclosed embodiments. One of ordinary skill in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

In the present disclosure, selective filters and high pass filters are combined to achieve the benefits of both filters, in particular high blue-cut and high UV protection without a significant increase in YI and decrease in % T of the resulting lenses. The selective filter and high pass filter may be incorporated into a lens through filters in wafers or in bulk to provide lenses with both high blue-cut and high UV-cut.

One advantage of the presently disclosed method is that no extra process steps are needed. Both filters may be mixed together and be incorporated into the same wafer or lens.

Figure 4:
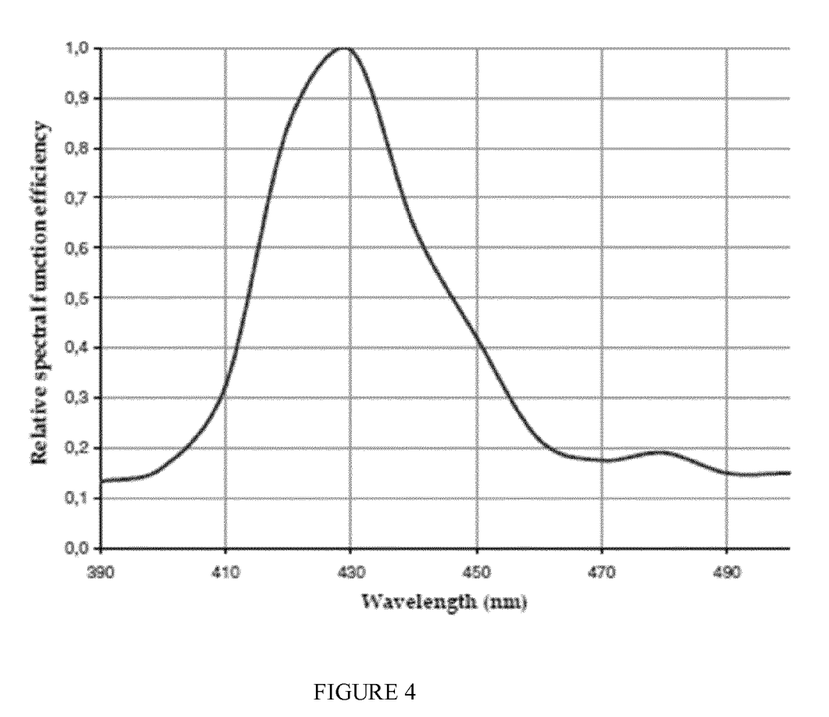
FIG. 4 is a graph of showing the blue light hazard function B'(λ) (relative spectral efficiency)

Blue-cut of a lens is typically defined by:

$$\text{Blue light cut } (\%) = 100 - T_{sb}$$

$$T_{sb} = \frac{\int_{380\,nm}^{500\,nm} T(\lambda) \cdot E_{s\lambda}(\lambda) \cdot B(\lambda) \cdot d\lambda}{\int_{380\,nm}^{500\,nm} E_{s\lambda}(\lambda) \cdot B(\lambda) \cdot d\lambda}$$

where
T(λ): Transmittance (%) with 5 nm pitch
$E_{s\lambda}(\lambda)$: Solar spectral irradiation (ISO 8980-3: Annex B)
B(λ): Blue light hazard function (ISO 8980-3: Annex B)
The blue-cut performance can be measured according to the following formula $$BVC(B') = 100\% - \frac{\int_{400\,nm}^{455\,nm} B'(\lambda) \cdot T(\lambda) \cdot d\lambda}{\int_{400\,nm}^{455\,nm} B'(\lambda) \cdot d\lambda}$$

or $$BVC(B) = 100\% - \frac{\int_{400\,nm}^{455\,nm} B(\lambda) \cdot T(\lambda) \cdot d\lambda}{\int_{400\,nm}^{455\,nm} B(\lambda) \cdot d\lambda}$$

where
T(λ): Transmittance (%) with 5 nm pitch at a given wavelength measured at 0° incidence
B(λ): Blue light hazard function (Annex B of ISO 8980-3)
B'(λ): Blue light hazard function (Arnault et al., PlosOne, 2013) shown on FIG. 4 (relative spectral function efficiency).
Said light hazard function results from work between Paris Vision Institute and Essilor International.
Table hereafter mentions B'(λ) used in the calculations of BVC(B'):

| Wavelength (nm) | Ponderation coefficient B(λ) |
|---|---|
| 400 | 0.1618 |
| 410 | 0.3263 |
| 420 | 0.8496 |
| 430 | 1.00 |
| 440 | 0.6469 |
| 450 | 0.4237 |

The blue-cut performance of a lens is a function of the transmittance T(λ), which is directly linked to its color appearance corresponding to a specific transmission spectrum.

Hence, it is important for a lens to have consistent and stable color to achieve constant blue-cut performance. RCAR mainly and BVC(B') are used herein as a measure of lens blue-cut performance.

The photoprotective potency PP or RCAR (Retinal Cell Apoptosis Reduction) of a lens is determined as the difference between the light-induced apoptosis rate without the filtering of the lens $A_{NF}$ and the light-induced apoptosis rate with the lens $A_F$ divided by the light-induced apoptosis rate without any lens $A_{NF}$:

$$RCAR(\%) = (A_{NF} - A_F)/A_{NF}.$$

RCAR can be measured by in vitro measurements by measuring the effect of the lens equipped with blue filter on the retinal apoptosis A2E-loaded retinal pigment epithelium cells.

This in vitro model that comprises A2E-loaded retinal pigment epithelium cells, is described in details in the paper titled "Phototoxic Action Spectrum on a retinal Pigment Epithelium model of Age-Related macular Degeneration Exposed to Sunlight Normalized Conditions", by author Arnault, Barrau et al. published on Aug. 23, 2013 in the peer-reviewed scientific Journal PlosOne (availableon plosone.org website).

The in vitro measurements using narrow band light sources or a broadband visible light source are described in European patent application EP16158842.1 filed Mar. 4, 2016 in the name of applicant.

The measurement of RCAR can also be calculated directly from the transmission spectrum of the lens of the invention by using a calculation model correlated with the experimental in vitro results as described in European patent application EP16158842.1

YI The degree of yellowness of the inventive optical article may be quantified by means of colorimetric measurements, based on the CIE tristimulus values X, Y, Z such as described in the standard ASTM E313 with illuminant C observer 2°. The optical article according to the invention preferably has a low yellowness index YI, lower than 5, as measured according to the above standard. The yellowness index Yi is calculated per ASTM method E313 through the relation YI=(127.69 X−105.92 Z))/Y, where X, Y, and Z are the CIE tristimulus values.

EXAMPLES

PC Blue-Cut Lens Preparation

The lens preparation methods described below employed Lexan PC resin supplied by SABIC in combination with one or both of ABS420™ selective filter supplied by Exciton and a Tinuvin™ 326 high-pass filter supplied by BASF. The resin was mixed with different filter concentrations then injection molded into lenses using a BOY injection molding machine. The lens specifications were 1.1 mm plano flat lens with 60 mm diameter.

Example 1 Plano Lenses with ABS420™ Only

Table 1 includes results for lenses that included ABS420™ only. The lens blue-cut performance, determined by the parameter RCAR, correlated with ABS420™ concentration. Lens UV-cut remained constant at 383 nm for the four lens samples, while lens YI increased and T % slightly decreased.

TABLE 1

Plano Lenses with ABS420 ™ only

| ABS420 ™ conc. (ppm) | BVC (B') | RCAR | UV-cut | T % | YI |
|---|---|---|---|---|---|
| 0.00 | 3.9% | 6.9% | 383 | 97.3 | 0.8 |
| 1.00 | 10.8% | 18.0% | 383 | 96.9 | 2.8 |
| 1.56 | 14.2% | 22.3% | 383 | 96.7 | 3.9 |
| 1.96 | 20.6% | 25.9% | 383 | 96.6 | 5.5 |

Example 2 Plano Lenses with Tinuvin™ 326 Only

Table 2 includes results for lenses that included Tinuvin™ 326 only. Lens blue-cut performance and UV-cut increased with increasing Tinuvin™326 concentration. Lens YI also increased, while T % almost unchanged.

TABLE 2

Plano Lenses with Tinuvin ™326 only

| Tinuvin326 conc. (%) | BVC (B') | RCAR | UV-cut | T % | YI |
|---|---|---|---|---|---|
| 0.0 | 3.9% | 6.9% | 383 | 97.3 | 0.8 |
| 0.1 | 10.9% | 11.0% | 391 | 97.3 | 1.9 |
| 0.3 | 18.3% | 15.6% | 400 | 97.1 | 3.3 |
| 0.5 | 22.8% | 18.6% | 403 | 97.1 | 4.5 |
| 1.0 | 32.5% | 25.8% | 408 | 97.0 | 6.9 |

Figure 1:
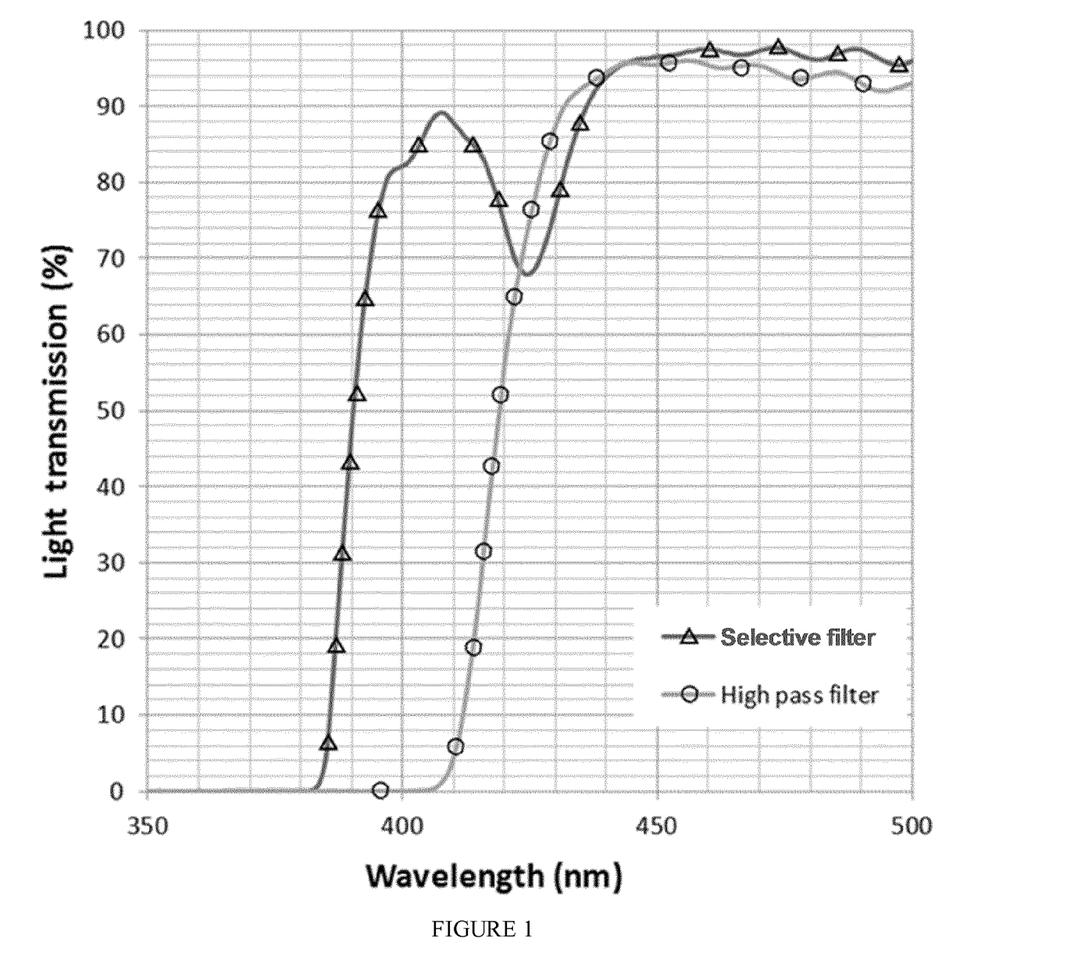
FIG. 1 is a graph depicting light transmission through a notch filter and a high pass filter.
Figure 2:
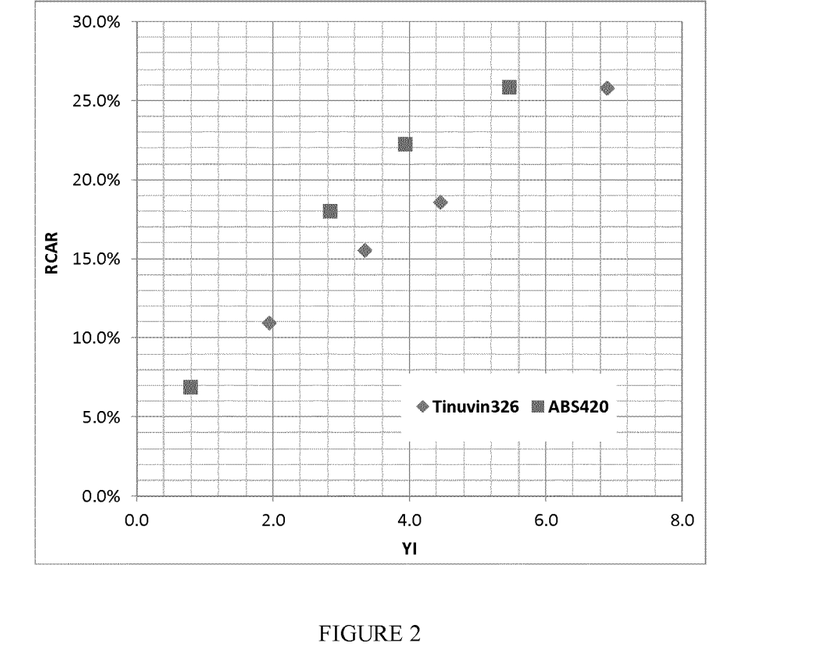
FIG. 2 is graph of lens RCAR plotted against YI of two lenses to compare filter efficiency of Tinuvin™326 and ABS420™.

FIG. 2 is a graph of RCAR plotted against YI to compare filters' blue-cut efficiencies. A steeper slope corresponds to higher blue-cut efficiency.

Tinuvin™ 326 lenses appear more yellow at the same level of RCAR.

ABS420™ is thus concluded to be more efficient than Tinuvin™ 326 based on RCAR.

Example 3 Plano Lenses with Tinuvin™326 and ABS420™

Table 3 includes results for lenses that included Tinuvin™326 and ABS420™. By mixing ABS420™ with Tinuvin™326, higher blue-cut, i.e., higher RCAR and higher UV-cut were achieved, with negligible impact on T % and YI. The best results were observed for an ABS420™ concentration 1 ppm, and a Tinuvin™326 concentration of 0.3%. Similar results were observed in the examples included in Table 4.

TABLE 3

Plano Lenses with ABS420 ™ and Tinuvin ™326

| ABS420 ™ conc. (ppm) | Tinuvin ™326 conc. (%) | BVC (B') | RCAR | UV-cut | T % | YI |
|---|---|---|---|---|---|---|
| 1.00 | 0.1 | 17.4% | 20.9% | 390 | 97.0 | 4.1 |
| 1.56 | 0.1 | 21.7% | 25.7% | 390 | 96.7 | 5.4 |
| 1.00 | 0.3 | 24.5% | 23.9% | 400 | 96.8 | 5.4 |
| 1.56 | 0.3 | 28.0% | 27.4% | 400 | 96.6 | 6.5 |

Figure 3:
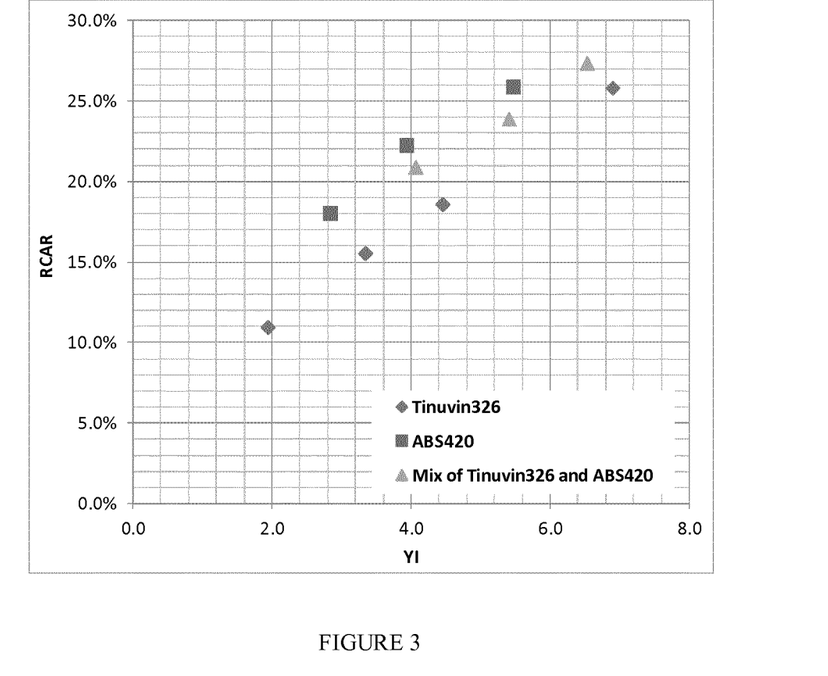
FIG. 3 is graph of lens RCAR plotted against YI of lenses containing Tinuvin™ 326, ABS420™, or a combination of the two.

In FIG. 3, lens RCAR was plotted against YI for mixed Tinuvin™326 and ABS420™, and compared to those with Tinuvin™326 only and ABS420™ only. Lenses with both Tinuvin™326 and ABS420™ exhibited RCAR values intermediate to single-component lenses but closer to ABS420™

TABLE 4

Plano Lenses with ABS420 ™ and Tinuvin ™ 326

| ABS420 ™ conc. (ppm) | Tinuvin ™326 conc.(%) | BVC (B') | RCAR | UV-cut | T % | YI |
|---|---|---|---|---|---|---|
| 1.00 | 0 | 10.8% | 18.0% | 383 | 96.9 | 2.8 |
| 1.96 | 0 | 20.6% | 25.9% | 383 | 96.6 | 5.5 |
| 1.00 | 0.3 | 24.5% | 23.9% | 400 | 96.8 | 5.4 |
| 0.00 | 0.3 | 18.3% | 15.6% | 400 | 97.1 | 3.3 |
| 0.00 | 0.5 | 22.8% | 18.6% | 403 | 97.1 | 4.5 |
| 0.00 | 1.0 | 32.5% | 25.8% | 408 | 97.0 | 6.9 |

Example 4 Powered Lenses with Tinuvin™ 326 and ABS420™

FSV (Finished single vision) −6.00 lenses (72 mm diameter, 1.3 mm CT) were molded either ABS420™, Tinuvin™

326, or a combination of the two. Lens properties at center were measured and listed in Table 5, for both HMC treated (having a hard coat such as described in example 3 of EP614 and an antireflective coating Crizal Forte) and uncoated lenses. Table 5 shows that lenses made with mixed ABS420™ and Tinuvin™326 exhibit low yellowness at the same RCAR while still maintaining the UV-cut at ~400 nm (highest UV wavelength).

TABLE 5

PC Blue-Cut Lens Properties

| | | BVC (B') | RCAR | UV-cut | T % | L | a* | b* |
|---|---|---|---|---|---|---|---|---|
| FSV-6.00, HMC | ABS420 ™ only | 16.9% | 25.2% | 383 | 96.5 | 98.6 | −0.7 | 2.8 |
| | Tinuvin ™326 only | 30.2% | 23.7% | 408 | 97.0 | 98.8 | −2.3 | 5.2 |
| | ABS420 ™ + Tinuvin ™326 | 26.4% | 26.2% | 399 | 96.5 | 98.6 | −1.7 | 4.4 |
| FSV-6.00, UNC | ABS420 ™ only | 23.1% | 31.3% | 383 | 88.5 | 95.3 | −1.2 | 3.0 |
| | Tinuvin ™326 only | 37.5% | 31.6% | 408 | 88.9 | 95.5 | −2.8 | 5.7 |
| | ABS420 ™ + Tinuvin ™326 | 33.5% | 32.8% | 399 | 88.6 | 95.4 | −2.2 | 5.0 |

The lenses of Example 4 were also measured at their edge, and ΔE was calculated using CIE76 equation as shown below to determine color heterogeneity between center and edge. Generally, lower ΔE means less color heterogeneity. Results are shown in Table 6.

$$\Delta E = \sqrt{(\Delta L)^2 + (\Delta a^*)^2 + (\Delta b^*)^2}$$

TABLE 6

ΔE Between Lens Center and Edge

| | ABS420 ™ only | Tinuvin ™326 only | ABS420 ™ + Tinuvin ™326 |
|---|---|---|---|
| FSV-6.00, HMC | 13.4 | 12.4 | 12.9 |
| FSV-6.00, UNC | 13.3 | 11.9 | 12.5 |

Lenses made with mixed ABS420™ and Tinuvin™326 exhibit ΔE values intermediate to lenses with ABS420™ only and Tinuvin™ 326 only.

By mixing ABS420™ together with Tinuvin™ 326 into a PC resin, comparable blue-cut level can be achieved at a loading that is much lower than with either of the two components alone. The resulting lenses exhibit improved UV-cut over using ABS420™ only. At the same blue-cut level, the ABS420™+Tinuvin™ 326 displayed low yellowness without compromising color uniformity, a feature that is important to lens aesthetics.

The claims are not to be interpreted as including means-plus- or step-plus-function limitations, unless such a limitation is explicitly recited in a given claim using the phrase(s) "means for" or "step for," respectively.

The invention claimed is:

1. A transparent optical article with enhanced ultraviolet and blue light blocking ability comprising:
    a selective filter at least partially blocking blue light in a wavelength range chosen within the 400-460 nm range; and
    a high-pass filter having its maximum cut in the UV light wavelength range and partially blocking blue light in the 400-500 nm range;
    wherein the optical article blocks at least 66% of light with a wavelength less than or equal to about 410 nm, at each wavelength in the wavelength range 350-410 nm;
    wherein the selective filter is an absorbing dye that has an absorption peak centered at a wavelength chosen within the 410-440 nm wavelength range and exhibits a full width at half maximum lower than or equal to 40 nm.

2. The transparent optical article of claim 1, wherein the absorbing dye is a porphine, a porphyrin, a porphyrin complex or derivative.

3. The transparent optical article of claim 1, wherein the optical article comprises a polymer substrate comprising said absorbing dye dispersed or dissolved within said polymer substrate, at a concentration ranging from 1 to 10 ppm.

4. The transparent optical article of claim 1, wherein the high pass filter is a UV absorber.

5. The transparent optical article of claim 4, wherein the UV absorber is a benzotriazole compound.

6. The transparent optical article of claim 5, wherein the benzotriazole compound is 2-(5-chloro-2H-benzotriazole-2-yl)-6-(1, 1-dimethylethyl)-4-methyl phenol.

7. The transparent optical article of claim 4, wherein the optical article comprises a polymer substrate and, dispersed or dissolved therein, said UV absorber at a concentration ranging from 0.1 to 2.0 weight %.

8. The transparent optical article of claim 1, wherein the optical article has a BVC(B') value of ≥15%.

9. The transparent optical article of claim 1, wherein the optical article has a colorimetric coefficient b* as defined in the CIE (1976) L*a*b* international colorimetric system that is less than or equal to 5.

10. The transparent optical article of claim 1, wherein the selective filter and high-pass filter reduce the through transmittance of light with a wavelength less than or equal to about 410 nm in a synergistic fashion.

11. A wafer for reducing through-transmittance of light with a wavelength less than or equal to about 410 nm to a substrate, comprising:
    a blend of a transparent polymer resin;
    a selective filter at least partially blocking blue light in a wavelength range chosen within the 400-460 nm range; and
    a high-pass filter having its maximum cut in the UV light wavelength range and partially blocking blue light in the 400-500 nm range;
    wherein the selective filter is an absorbing dye that has an absorption peak centered at a wavelength chosen within the 410-440 nm wavelength range and exhibits a full width at half maximum lower than or equal to 40 nm.

12. The wafer of claim 11, wherein the wafer reduces through-transmittance of light with a wavelength less than or equal to about 408 nm to a substrate.

13. A process for protecting at least part of an eye of a user from phototoxic blue light, comprising the user obtaining and using an optical article of claim 1.

14. A process of enhancing the blue-cut performance of an optical element resin comprising:

blending a transparent polymer resin with a selective filter at least partially blocking blue light in a wavelength range chosen within the 400-460 nm range and a high-pass filter having its maximum cut in the UV light wavelength range; and partially blocking blue light in the 400-500 nm range by a process selected from the group consisting of dry blending, melt mixing, and solvent mixing;

wherein the selective filter is an absorbing dye that has an absorption peak centered at a wavelength chosen within the 410-440 nm wavelength range and exhibits a full width at half maximum lower than or equal to 40 nm.

15. The transparent optical article of claim 1, wherein the absorbing dye exhibits a full width at half maximum lower than or equal to 30 nm.

16. The transparent optical article of claim 1, wherein the absorbing dye exhibits a full width at half maximum lower than 25 nm.

17. The transparent optical article of claim 1, wherein the absorbing dye exhibits a full width at half maximum lower than 20 nm.

18. The transparent optical article of claim 1, wherein the absorbing dye exhibits a full width at half maximum higher than or equal to 5 nm.

19. The transparent optical article of claim 1, wherein the absorbing dye exhibits a full width at half maximum higher than or equal to 10 nm.

* * * * *